US010759929B2

(12) United States Patent
Taniike et al.

(10) Patent No.: US 10,759,929 B2
(45) Date of Patent: Sep. 1, 2020

(54) BIAXIALLY STRETCHED POLYPROPYLENE FILM FOR CAPACITORS

(71) Applicant: OJI HOLDINGS CORPORATION, Tokyo (JP)

(72) Inventors: Toshiaki Taniike, Nomi (JP); Minoru Terano, Nomi (JP); Ikki Katada, Nomi (JP); Tadakazu Ishiwata, Tokyo (JP); Masahiro Nakata, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 727 days.

(21) Appl. No.: 15/321,862

(22) PCT Filed: Mar. 31, 2015

(86) PCT No.: PCT/JP2015/060060
§ 371 (c)(1),
(2) Date: Dec. 23, 2016

(87) PCT Pub. No.: WO2016/002281
PCT Pub. Date: Jan. 7, 2016

(65) Prior Publication Data
US 2018/0208751 A1 Jul. 26, 2018

(30) Foreign Application Priority Data
Jun. 30, 2014 (JP) ................. 2014-134863

(51) Int. Cl.
*C08L 23/12* (2006.01)
*C08J 5/18* (2006.01)
*H01G 4/18* (2006.01)
*C08L 23/16* (2006.01)

(52) U.S. Cl.
CPC ................. *C08L 23/12* (2013.01); *C08J 5/18* (2013.01); *C08L 23/16* (2013.01); *H01G 4/18* (2013.01); *C08J 2323/12* (2013.01); *C08J 2423/08* (2013.01); *C08J 2423/12* (2013.01); *C08J 2423/14* (2013.01); *C08J 2423/16* (2013.01); *C08L 2203/16* (2013.01); *C08L 2203/20* (2013.01); *C08L 2203/206* (2013.01); *C08L 2205/025* (2013.01); *C08L 2205/24* (2013.01); *C08L 2207/07* (2013.01)

(58) Field of Classification Search
CPC .. C08L 23/12; C08L 2303/16; C08L 2203/20; C08L 2205/025; C08J 5/18; C08J 2323/12; C08J 2423/08; C08J 2423/14; C08J 2423/26; C08J 2423/12; C08J 2423/16; H01G 4/18; B32B 27/32
See application file for complete search history.

(56) References Cited

U.S. PATENT DOCUMENTS

| 8,089,746 | B2 | 1/2012 | Masuda |
| 9,349,538 | B2 | 5/2016 | Ishiwata |
| 9,431,172 | B2 | 8/2016 | Busch et al. |
| 2007/0110974 | A1 | 5/2007 | Ishiwata |
| 2009/0219672 | A1 | 9/2009 | Masuda |
| 2010/0003489 | A1* | 1/2010 | Busch ..................... B32B 27/32 |
| | | | 428/220 |
| 2010/0047544 | A1 | 2/2010 | Busch |
| 2010/0149470 | A1* | 6/2010 | Hino .......................... C08J 5/18 |
| | | | 349/117 |
| 2013/0288000 | A1 | 10/2013 | Ishiwata |

FOREIGN PATENT DOCUMENTS

| CN | 101292378 A | 10/2008 |
| CN | 103857733 A | 6/2014 |
| EP | 1826222 A1 | 8/2007 |
| EP | 2565221 A1 | 3/2013 |
| JP | H09-316283 A | 12/1997 |
| JP | 2004-161799 A | 6/2004 |
| JP | 2004-175976 A | 6/2004 |
| JP | 2007-246898 A1 | 9/2007 |
| JP | 2008-276164 A1 | 11/2008 |
| JP | 2010-501382 A | 1/2010 |
| JP | 2010-501712 A1 | 1/2010 |
| JP | 2010-280795 A1 | 12/2010 |
| JP | 2012-149171 A1 | 8/2012 |
| JP | 2014-077057 A1 | 5/2014 |
| WO | 2009/060944 A1 | 5/2009 |

OTHER PUBLICATIONS

Extended European Search Report for the corresponding EP patent application No. 15815133.2 dated Jan. 30, 2018 (5 Sheets).
Chinese Office Action for corresponding CN patent application No. 201580035623.5 dated Jan. 22, 2018 (12 Sheets).
JP 2004-161799, machine translation.
Japanese Patent Application No. 2014-134863: Notification of Reasons for Refusal dated Mar. 22, 2017.
International Search Report for International Application No. PCT/JP2015/060060 dated Jun. 23, 2015.

* cited by examiner

*Primary Examiner* — Bijan Ahvazi
(74) *Attorney, Agent, or Firm* — Kratz, Quintos & Hanson, LLP

(57) ABSTRACT

A main object is to provide a biaxially stretched polypropylene film for capacitors that has high voltage resistance at high temperatures and excellent dielectric breakdown properties and that can be formed into an ultrathin film. Furthermore, a capacitor obtained by using the biaxially stretched polypropylene film for capacitors described above is provided.
The biaxially stretched polypropylene film for capacitors, includes a polypropylene resin, and the film has a spacing value of (040) face of α-crystal measured by X-ray diffraction of 0.525 to 0.530 nm.

5 Claims, No Drawings

BIAXIALLY STRETCHED POLYPROPYLENE FILM FOR CAPACITORS

TECHNICAL FIELD

The present invention relates to a biaxially stretched polypropylene film for capacitors, the biaxially stretched polypropylene film having excellent dielectric breakdown properties.

BACKGROUND ART

Biaxially stretched polypropylene films have excellent electrical properties, such as voltage resistance and low dielectric loss characteristics, and high moisture resistance. By utilizing these properties, biaxially stretched polypropylene films have been suitably used as dielectric films for capacitors, such as high voltage capacitors, filter capacitors for various switching regulators, converters, inverters, and the like, and smoothing capacitors, among electric and electronic devices. Furthermore, polypropylene films have started to be used also as capacitors for inverter power supplies that regulate drive motors of electric cars, hybrid cars, and the like which have been increasingly in demand in recent years.

For such capacitors for inverter power supplies used in automobiles or the like, further reductions in size and weight of capacitors have been demanded along with the reductions in size and weight of vehicles. To reduce size and weight of a capacitor, as a film for capacitors, a polypropylene film with high stretching performance may be used as a capacitor film and formed into an ultrathin film, for example. However, since an ultrathin film readily causes dielectric breakdown when a high voltage is applied, polypropylene films having even higher voltage resistance have been required.

To obtain a polypropylene film having such high voltage resistance, molecular designing of the polypropylene or the like have been performed. Examples thereof include a method in which the polypropylene resin components are selected in a manner that the molecular weight distribution is widely distributed in low molecular weight side, and the like. By allowing the molecular weight distribution to be widely distributed in the low molecular weight side, appropriate resin flowability is exhibited during biaxial stretching, and both the voltage resistance and thin film thickness can be achieved. Examples of the method to adjust such a molecular weight distribution include a method in which polypropylene having a high melt flow rate, that is, polypropylene having a low molecular weight, is mixed to a polypropylene resin, and the like (e.g. Patent Document 1). Examples thereof further include a method in which the proportion of polypropylene having a low molecular weight in the polypropylene resin is increased by selectively subjecting polypropylene having a high molecular weight to peroxidative decomposition treatment using peroxide (e.g. Patent Document 2), and the like.

Furthermore, examples thereof further include a method in which size of spherulites, produced in a step of cooling a melt-extruded resin sheet by adding branched chain polypropylene which is a high melt tension polymer for a polypropylene resin, is controlled to be small (e.g. Patent Document 3). Furthermore, Patent Document 3 further discloses a method to control a surface of a film by adding a small amount of branched chain polypropylene.

As described above, various methods have been employed to obtain polypropylene films for use in capacitors. However, to further reduce size and weight of a capacitor, further voltage resistance of a polypropylene film that has been formed into a thin film is required.

CITATION LIST

Patent Literature

Patent Document 1: WO/2009/060944
Patent Document 2: Japanese Unexamined Patent Application Publication No. 2012-149171A
Patent Document 3: Japanese Unexamined Patent Application Publication No. 2007-246898A

SUMMARY OF INVENTION

Technical Problem

A main object of the present invention is to provide a biaxially stretched polypropylene film for capacitors, which has voltage resistance at high temperatures and excellent dielectric breakdown properties and which can be formed into an ultrathin film. Furthermore, another object is to provide a capacitor obtained by using the biaxially stretched polypropylene film for capacitors described above.

Solution to Problem

As a result of diligent research to solve the problems described above, the inventors of the present invention focused on the crystal structure of polypropylene constituting a polypropylene film, and found that dielectric breakdown properties are significantly affected by change in a spacing value between molecular chains of the polypropylene in the polypropylene film, that is, change in a distance between molecular chains in the polypropylene in the polypropylene film (i.e. packed state of molecular chains). The present invention is completed by the findings described above.

Item 1: A biaxially stretched polypropylene film for capacitors, including a polypropylene resin, the film having a spacing value of (040) face of α-crystal measured by X-ray diffraction of 0.525 to 0.530 nm.

Item 2: The biaxially stretched polypropylene film for capacitors according to Item 1, wherein the lattice constant in an a-axis direction is from 0.665 to 0.675 nm, and the lattice constant in a b-axis direction is from 2.100 to 2.120 nm, as determined from the spacing value of α-crystal measured by X-ray diffraction.

Item 3: The biaxially stretched polypropylene film for capacitors according to Item 1 or 2, wherein the polypropylene film has a crystallite size of 13.5 nm or less as determined by the Scherrer's equation from the half width of the reflection peak from (040) face of α-crystal measured by a wide angle X-ray diffraction method.

Item 4: The biaxially stretched polypropylene film for capacitors according to any one of Items 1 to 3, wherein the polypropylene resin contains:
(1) polypropylene having a weight average molecular weight of 250,000 to 450,000 and a molecular weight distribution of 6 to 12; and
(2) at least one polymer selected from the group consisting of
(2a) long-chain branched polypropylene,
(2b) an ethylene-propylene copolymer having an ethylene content of less than 5 mol %, and (2c) ultra-high-molecular-weight polypropylene having a weight average molecular weight of 800,000 to 1,400,000 and a molecular weight distribution of 3 to 6.

Item 5: The biaxially stretched polypropylene film for capacitors according to any one of Items 1 to 4, wherein the polymer (2) is contained in an amount of 10 to 40 mass % in the polypropylene resin.

Item 6: An electrode-containing biaxially stretched polypropylene film for capacitors, including the biaxially stretched polypropylene film for capacitors according to any one of Items 1 to 5, and an electrode on one side or both sides of the polypropylene film.

Item 7: A capacitor including the biaxially stretched polypropylene film for capacitors according to any one of Items 1 to 6.

Advantageous Effects of Invention

The biaxially stretched polypropylene film for capacitors of the present invention has high voltage resistance at high temperatures and excellent dielectric breakdown properties.

Furthermore, a capacitor comprising the biaxially stretched polypropylene film for capacitors of the present invention can be subjected to size reduction and weight reduction by forming the polypropylene film into a thin film.

Furthermore, the capacitor comprising the biaxially stretched polypropylene film for capacitors of the present invention can be suitably used as a high-capacity capacitor to which high voltages are applied at high temperatures.

DESCRIPTION OF EMBODIMENTS

The biaxially stretched polypropylene film for capacitors of the present invention has a particular spacing value of (040) face of α-crystal. The biaxially stretched polypropylene film for capacitors of the present invention will be described in detail below.

The spacing value of (040) face of α-crystal of the biaxially stretched polypropylene film for capacitors of the present invention is from 0.525 to 0.530 nm, and preferably approximately from 0.525 to 0.529 nm. When the spacing value of (040) face of α-crystal is less than 0.525 nm, the molecular chains are closely packed and thus the resulting crystal lattice becomes too small, thereby making the size of the resulting crystallite (crystallite size) larger as a result. Because of this, leakage current tends to be large when a high voltage is applied. Furthermore, structural disorder due to Joule heating caused by leakage current tends to occur, and heat resistance, voltage resistance, and dielectric breakdown properties tend to be deteriorated. On the other hand, when the spacing value of (040) face of α-crystal is greater than 0.530 nm, packed state of the molecular chains becomes "loose (coarse)" which is no longer considered to be a crystal structure of α-crystal of polypropylene. Therefore, the long-distance order cannot be maintained, and as a result, reduction in crystallinity occurs and thus dielectric breakdown properties tend to be deteriorated.

The spacing value of (040) face of α-crystal is measured by a wide angle X-ray diffraction (XRD) method. More specifically, XRD is used for biaxially stretched polypropylene film or a metallized film thereof to measure the diffraction angle 2θ of (040) face of α-crystal, and the spacing value is calculated using the following Bragg's equation.

$$2d \sin \theta = \lambda \quad (1)$$

In the equation, d is the spacing value, θ is the measured diffraction Bragg angle, and λ is the wavelength of the used X-ray (in the present invention, λ=0.15418 nm).

In the present invention, to measure the diffraction intensity curve of the α-crystal of the biaxially stretched polypropylene film, that is, to measure the diffraction angle 2θ, measurement is performed, more specifically, using a desktop X-ray diffraction instrument, MiniFlex 300 (trade name), manufactured by Rigaku Corporation under the following conditions.

X-rays generated at an output of 30 kV and 10 mA are used. The CuKα radiation that is monochromatized by a graphite monochromator (wavelength: 0.15418 nm) is parallelized by a slit, and a film to be measured is irradiated by the CuKα radiation. The diffraction intensity is measured by coupled 2θ/θ scan using a goniometer by using a scintillation counter. The diffraction angle 2θ of the reflection of the α-crystal is determined from the obtained data using the integrated X-ray powder diffraction software PDXL provided in the instrument.

Furthermore, from the spacing value d of crystal diffractions of (110) face of α-crystal, (040) face of α-crystal, (130) face of α-crystal, and the like obtained by the wide angle X-ray diffraction measurement described above, the lattice constants of the a-axis, the b-axis, and the c-axis of the polypropylene crystal are determined by the following Equation (2).

[Equation 1]

$$\frac{1}{d^2} = \frac{1}{\sin^2 \beta} \left( \frac{h^2}{a^2} + \frac{k^2 \sin^2 \beta}{b^2} + \frac{l^2}{c^2} - \frac{2hl \cos \beta}{ac} \right) \quad (2)$$

In Equation (2), d is the spacing value of α-crystal, h, k, and l are Miller indices (hkl) of the α-crystal assigned to the spacing value thereof (in the case where the indices are assigned to the diffraction lines of (040) face of α-crystal, h=0, k=4, and l=0), a is the lattice constant of the a-axis, b is the lattice constant of the b-axis, c is the lattice constant of the c-axis, and β is the angle of inclination formed by the a-axis and the c-axis (when the α-crystal is a monoclinic crystal).

Polymer Handbook, 4th ed.; John Wiley & Sons: NY, 1999 describes that the lattice constants of α-crystal (monoclinic crystal) of isotactic polypropylene are a=0.665 nm, b=2.096 nm, c=0.650 nm, and β=99.33°. Since lattice constants are intrinsic values, lattice constants should be approximately the same as these lattice constants in the case of pure polypropylene; however, in the present invention, the internal structure (packed state of molecular chains=spacing value) varies due to the effect of blending at least two types of polypropylenes or the like as described below, thereby enlarging the lattice of a-b face.

The lattice constant of the a-axis calculated by Equation (2) above is preferably approximately from 0.665 to 0.675 nm, and more preferably approximately from 0.667 to 0.674 nm. Furthermore, the lattice constant of the b-axis is preferably approximately from 2.100 to 2.120 nm, and more preferably approximately from 2.105 to 2.120 nm.

By setting the lattice constant of the a-axis to 0.665 nm or more, and the lattice constant of the b-axis to 2.100 nm or more, which are the values greater than the standard size of the a-b face lattice described in the "Polymer Handbook", the molecular chains are packed loosely (coarsely) and, as a result, the size of the formed crystal (crystallite size) becomes smaller. As a result, since the leakage current when a high voltage is applied becomes smaller, Joule heating due to the leakage current is suppressed even when a high voltage is applied. Therefore, excellent dielectric breakdown properties can be imparted to the resulting biaxially stretched polypropylene film, which is preferable. On the other hand, from the perspective of maintaining the crystal structure of the α-crystal, the lattice constant of the a-axis is preferably set to 0.675 nm or less, and the lattice constant of the b-axis is preferably set to 2.120 nm or less.

When the lattice has a size greater than these values, packed state of the molecular chains becomes "loose (coarse)" which is no longer considered to be a crystal structure of α-crystal of polypropylene. Because of this, the long-distance order cannot be maintained, and as a result, reduction in crystallinity may occur and dielectric breakdown properties may be deteriorated.

The lattice constant of the c-axis calculated by Equation (2) above is not particularly limited, and may be the value described in the "Polymer Handbook". For example, the lattice constant of the c-axis of approximately 0.645 to 0.655 nm is preferable, and similarly, the angle of inclination 13 may be the value described in the "Polymer Handbook", and may be, for example, approximately from 98.83 to 99.85°.

From the perspective of voltage resistance, the biaxially stretched polypropylene film for capacitors of the present invention preferably has a crystallite size of 13.5 nm or less when it is calculated from a half width of the reflection peak from (040) face of α-crystal measured by the wide angle X-ray diffraction method by the use of the Scherrer's equation.

In the present invention, "crystallite size" of a polypropylene film indicates the crystallite size calculated from the half width of the reflection peak from (040) face of α-crystal of the polypropylene film measured by the wide angle X-ray diffraction method (XRD method) by the use of the Scherrer's equation described below.

The crystallite size is more preferably 13.4 nm or less, and even more preferably 13.3 nm or less. When the polypropylene film having the crystallite size within the range described above is used, electric current does not pass through the crystal. Thus, due to the morphological effects (e.g. similar to the fact that it is difficult for water to permeate through fine sand), the leakage current is made smaller. As a result, occurrence of structural disorder due to Joule heating is suppressed, and thus excellent heat resistance, voltage resistance, and long-term heat resistance and voltage resistance are achieved. The crystallite size of the polypropylene film is preferably 10.0 nm or more, and more preferably 10.5 nm or more, from the perspective of maintaining mechanical strength and melting point of the polypropylene film. Note that the lower limit of the crystallite size is typically considered to be approximately 10.0 nm, taking mechanical strength or the like and thickness of lamella (folded crystal) of high molecular weight chains into consideration.

Specifically, the "crystallite size" of the polypropylene film of the present invention can be determined as described below. First, the wide angle X-ray diffraction method is carried out on the biaxially stretched polypropylene film or the metallized film thereof to determine the half width of the reflection peak from obtained (040) face of α-crystal. Then, from the obtained half width of the reflection peak from (040) face of α-crystal, the crystallite size is determined using the Scherrer's equation expressed by Equation (3) below. Note that, in the present invention, the shape factor K is taken to be 0.94, and λ=0.15418 nm.

$$D=K\lambda/(\beta \cos \theta) \quad (3)$$

In Equation (3), D is the crystallite size (nm), K is a constant (shape factor), λ is the used X-ray wavelength (nm), β is the half width of the reflection peak from (040) face of α-crystal, and θ is the diffraction Bragg angle of (040) face of α-crystal.

In the present invention, to measure the reflection peak from (040) face of α-crystal, more specifically, a desktop X-ray diffraction instrument, MiniFlex 300 (trade name), manufactured by Rigaku Corporation is used. X-rays generated at an output of 30 kV and 10 mA are used. The CuKα radiation that is monochromatized by a graphite monochromator (wavelength: 0.15418 nm) is parallelized by a slit and irradiated on a film to be measured. The diffraction intensity is measured by coupled 2θ/θ scan using a goniometer by using a scintillation counter. The half width of the reflection peak from (040) face of α-crystal is determined from the obtained data using the integrated X-ray powder diffraction software PDXL provided in the instrument.

The biaxially stretched polypropylene film for capacitors of the present invention contains a polypropylene resin.

The melt flow rate (MFR) of the polypropylene resin used in the biaxially stretched polypropylene film for capacitors of the present invention at 230° C. is preferably 7 g/10 min or less, and more preferably 6 g/10 min or less, from the perspective of stretchability. Furthermore, from the perspective of enhancing the thickness precision of the biaxially stretched polypropylene film of the present invention, the MFR is preferably 1 g/10 min or more, and more preferably 1.5 g/10 min or more. Note that the MFR can be measured in accordance with JIS K 7210-1999.

The polypropylene resin preferably contains polypropylene (1), and at least one type of polymer (2) selected from the group consisting of long-chain branched polypropylene (2a), an ethylene-propylene copolymer (2b), and ultra-high-molecular-weight polypropylene (2c), from the perspective of easily obtaining a polypropylene film having the particular spacing value of (040) face of α-crystal.

The weight average molecular weight (Mw) of the polypropylene (1) is preferably 250,000 or more and 450,000 or less. By using such a polypropylene resin, resin flowability suitable for biaxial stretching can be obtained, and control of the thickness of a cast sheet (extruded sheet) is facilitated. The use of such a polypropylene resin is preferred since, for example, a biaxially stretched polypropylene film that is formed into an ultrathin film and that is suitable for use in small and high-capacity capacitors can be obtained more easily. Furthermore, the use of such a polypropylene resin is preferred since unevenness of the thickness of the cast sheet and the biaxially stretched polypropylene film is less likely to occur. The weight average molecular weight (Mw) of the polypropylene (1) is more preferably 270,000 or more, and even more preferably 290,000 or more, from the perspective of uniformity in thickness, mechanical characteristics, thermomechanical property, and the like of the biaxially stretched polypropylene film. The weight average molecular weight (Mw) of the polypropylene resin is more preferably 400,000 or less from the perspectives of flowability of the polypropylene resin, and stretchability at the time when the biaxially stretched polypropylene film formed into an ultrathin film is obtained.

The molecular weight distribution (Mw/Mn) calculated as the ratio of the weight average molecular weight (Mw) to the number average molecular weight (Mn) of the polypropylene (1) is preferably 6 or more and 12 or less. Furthermore, the molecular weight distribution (Mw/Mn) is more preferably 7 or more, and even more preferably 7.5 or more. Furthermore, the molecular weight distribution (Mw/Mn) is more preferably 11 or less, and even more preferably 10 or less. The use of the polypropylene (1) described above is preferred since resin flowability suitable for biaxial stretching can be obtained and a biaxially stretched propylene film that is formed into a ultrathin film without unevenness in the thickness can be obtained more easily. Furthermore, the polypropylene described above is preferred also from the perspective of voltage resistance of the biaxially stretched polypropylene film.

The weight average molecular weight (Mw) and the number average molecular weight (Mn) of the polypropylene (1) can be measured by gel permeation chromatography (GPC) analysis. The GPC instrument used in the GPC analysis is not particularly limited, and a commercially available high temperature GPC instrument that can analyze the molecular weight of polyolefins, such as high temperature GPC instrument with built-in differential refractometer (RI), HLC-8121GPC-HT, manufactured by Tosoh Corporation, can be used. In this case, for example, measurement is performed by using three TSKgel GMHHR-H(20)HT, manufactured by Tosoh Corporation, connected as the GPC column, setting the column temperature to 140° C., and using trichlorobenzene as an eluent, at a flow rate of 1.0 mL/min. A calibration curve is typically created using a polystyrene standard, and a weight average molecular weight (Mw) and a number average molecular weight (Mn) are obtained based on calibration with the polystyrene.

Examples of the polypropylene (1) include homopolymers of polypropylenes, such as isotactic polypropylene and syndiotactic polypropylene, and copolymers of polypropylene and polyethylene. From the perspective of heat resistance, the polypropylene (1) is preferably an isotactic polypropylene, and more preferably an isotactic polypropylene obtained by homopolymerizing polypropylene in the presence of a catalyst for olefin polymerization.

The mesopentad fraction ([mmmm]) of the polypropylene (1) is preferably 94% or more and 98% or less. Furthermore, the mesopentad fraction is more preferably 95% or more and 97% or less. When the polypropylene resin containing the polypropylene (1) is used, the crystallinity of the resin is suitably enhanced due to its suitably high stereoregularity, and initial voltage resistance and long-term voltage resistance are enhanced. Meanwhile, desired stretchability can be achieved by appropriate solidification (crystallization) rate during formation of a cast sheet.

Mesopentad fraction ([mmmm]) is an indicator of stereoregularity that can be obtained by high temperature nuclear magnetic resonance (NMR) analysis. Specifically, for example, the mesopentad fraction can be measured by using JNM-ECP500, high temperature Fourier transform nuclear magnetic resonance (high temperature FT-NMR), manufactured by JEOL Ltd. The observed nucleus is $^{13}$C (125 MHz), the measuring temperature is 135° C., and a mixed solvent of o-dichlorobenzene (ODCB) and deuterated ODCB (mixing ratio=4/1)) can be used as the solvent to dissolve the polypropylene resin. High temperature NMR analysis can be carried out by, for example, the method described in "Polymer Analysis Handbook, New Edition, Japan Society for Analytical Chemistry—Research Committee of Polymer Analysis (ed.), Kinokuniya Co., Ltd., 1995, pp. 610".

Single-pulse proton broad-band decoupling can be used for the measurement mode, the pulse width is 9.1 μsec (45° pulse), the pulse interval is 5.5 sec, the cumulative number of measurements is 4,500, and the chemical shift standard is $CH_3$ (mmmm) at 21.7 ppm.

Pentad fraction, which represents stereoregularity, is calculated as a percentage from the integrated intensity of each signal derived from a combination (such as mmmm, mrrm, and the like) of pentads consisting of pentads arranged in the same direction (mesopentads (m)) and pentads arranged in different directions (racemopentads (r)). For example, the description in "T. Hayashi, et al., Polymer, Vol. 29, pp. 138 (1988)" or the like can be referred to regarding assignment of each signal derived from mmmm, mrrm, and the like.

The MFR of the polypropylene (1) at 230° C. is preferably 7 g/10 min or less, and more preferably 6 g/10 min or less, from the perspective of stretchability. Furthermore, from the perspective of enhancing the thickness precision of the biaxially stretched polypropylene film of the present invention, the MFR of the polypropylene (1) is preferably 3 g/10 min or more, and more preferably 4 g/10 min or more. Note that the MFR can be measured by a method similar to the method described above.

The polypropylene (1) can be produced using a conventionally known method. Examples of the polymerization method include vapor phase polymerization, bulk polymerization, and slurry polymerization. The polymerization may be single-stage polymerization using one polymerization reaction vessel, or may be multi-stage polymerization using two or more polymerization reaction vessels. Furthermore, polymerization may be performed by adding hydrogen or a comonomer as a molecular weight adjusting agent in a reaction vessel. As a polymerization catalyst, a conventionally known Ziegler-Natta catalyst can be used, and the polymerization catalyst may contain a co-catalyst component or a donor. The molecular weight, molecular weight distribution, stereoregularity, and the like of the polypropylene (1) can be controlled by appropriately adjusting the polymerization catalyst and other polymerization conditions.

The polymer (2) is preferably at least one type selected from the group consisting of long-chain branched polypropylene (2a), an ethylene-propylene copolymer (2b), and ultra-high-molecular-weight polypropylene (2c). By allowing such a polymer (2) to be contained, the packed state of the molecular chains that are formed by the polypropylene (1), which is the main polymer, changes due to the effect of blending at least two different types of polypropylenes (a sort of phase separation/interpenetrating effect). This is preferable since a polypropylene film having the particular spacing value of (040) face of α-crystal according to the present invention and having the crystal lattice of a-b face that has been enlarged to a size greater than a typical crystal lattice of a-b face can be obtained.

The long-chain branched polypropylene (2a) is polypropylene having a branching of a long chain. Specific examples thereof include Profax PF-814, PF-611, and PF-633 manufactured by Basell, Daploy HMS-PP (such as WB130HMS, WB135HMS, and WB140HMS) manufactured by Borealis, and the like.

The MFR of the long-chain branched polypropylene (2a) at 230° C. is preferably 1 g/10 min or more and 20 g/10 min or less, and more preferably 1 g/10 min or more and 10 g/10 min or less, from the perspective of film formability.

Furthermore, in the case of branched chain molecule, melt tension tends to be high; however, the melt tension of the long-chain branched polypropylene (2a) of the present invention is preferably 1 cN or more and 50 cN or less, and more preferably 10 cN or more and 40 cN or less.

The ethylene-propylene copolymer (2b) may be any copolymer selected from random copolymers, block copolymers, graft copolymers, and the like; however, from the perspective of availability and the perspective of effectively obtaining the particular spacing value of (040) face of α-crystal of the present invention, a random copolymer is preferable.

The ethylene content of the ethylene-propylene copolymer (2b) is preferably less than 5 mol %. More specifically, the ethylene content is preferably 0.1 mol % or more and less than 5 mol %, and more preferably approximately from 0.5 to 3 mol %. An ethylene content of 0.1 mol % or more is necessary to effectively obtain the particular spacing value of (040) face of α-crystal of the present invention. An ethylene content of 5 mol % or more is not preferable since such ethylene content significantly increases the reduction in the crystallinity (also, reduction in the melting point), and as a result, the crystallinity of the biaxially stretched polypropylene film is reduced and the dielectric breakdown properties may be deteriorated.

The ethylene content is determined, for example, by using a Fourier transform nuclear magnetic resonance spectrometer (FT-NMR) or the like. More specifically in the present invention, the observed nucleus can be determined by measuring for $^{13}C$ (100.6 MHz) using a high temperature FT-NMR VNMRS-400 manufactured by Varian.

The measurement mode can be inverse gated decoupling, and the chemical shift standard can be pentads of propylene unit (mmmm) (21.86 ppm).

The ethylene content (mol %) can be calculated from the integrated value of the signal of methylene carbons based on head-to-tail diads in accordance with the description in "Y.-D. Zhang et al., Polym. J. Vol. 35, pp. 551 (2003)" or the like.

The MFR of the ethylene-propylene copolymer (2b) at 230° C. is preferably 1 g/10 min or more and 20 g/10 min or less, and more preferably 1 g/10 min or more and 10 g/10 min or less, from the perspective of film formability.

The weight average molecular weight (Mw) of the ultra-high-molecular-weight polypropylene (2c) is preferably approximately from 800,000 to 1,400,000, and more preferably approximately from 900,000 to 1,200,000. The weight average molecular weight (Mw) of the ultra-high-molecular-weight polypropylene (2c) of 800,000 or less is not preferable since the weight average molecular weight is not much different from the molecular weight of conventional polypropylenes, thereby the effect thereof is limited. On the other hand, a weight average molecular weight (Mw) of greater than 1,400,000 is not practically preferable since mixing is difficult from the perspective of resin flowability and/or kneadability.

The molecular weight distribution (Mw/Mn) calculated as the ratio of the weight average molecular weight (Mw) to the number average molecular weight (Mn) of the ultra-high-molecular-weight polypropylene (2c) is preferably approximately from 3 to 6, and more preferably approximately from 3 to 5. By setting the molecular weight distribution (Mw/Mn) of the ultra-high-molecular-weight polypropylene (2c) to be within the range described above, the molecular weight distribution of the ultra-high-molecular-weight polypropylene (2c) becomes similar to the molecular weight distribution of the polypropylene (1). Because of this, excellent miscibility can be achieved, and the particular spacing value of (040) face of α-crystal of the present invention can be effectively obtained.

The number average molecular weight (Mn), weight average molecular weight (Mw), and the molecular weight distribution (Mw/Mn) of the ultra-high-molecular-weight polypropylene (2c) described above can be measured by the same methods as those for the "polypropylene (1)" described above.

The content of the polymer (2) in the polypropylene resin is preferably approximately from 10 to 40 mass %, and more preferably approximately from 20 to 40 mass %. When the content of the polymer (2) in the polypropylene resin is 10 mass % or more, the spacing value of (040) face of α-crystal of the polypropylene film can be set to be within the particular range, thereby achieving excellent dielectric breakdown properties. On the other hand, when the content of the polymer (2) in the polypropylene resin is greater than 40 mass %, reduction in crystallinity may occur and dielectric breakdown properties may be deteriorated. In addition, such a content is not practically preferable since film formation may be difficult and small crystallite size cannot be obtained, and thus desired effects cannot be obtained, for example.

When the polypropylene resin contains the polypropylene (1) and the polymer (2), the polypropylene (1) and the polymer (2) are preferably mixed in dried or molten state. Note that these resins may be mixed according to any non-limited mixing method, including a method by which the polymerized powder or pellets thereof are dry-blended by a mixer or the like, a method by which a blended resin is obtained by melt-kneading the polymerized powder or pellets thereof using a kneader.

In the present invention, another resin (hereinafter, also referred to as "other resin") excluding the polypropylene (1) and the polymer (2) described above may be mixed in the polypropylene resin composition in a range that does not impair the effect of the present invention. Note that "other resin" is not particularly limited, and conventionally known resins that are suitable for use in capacitors can be appropriately used also in the present invention. Examples of the other resin include other polyolefins except polypropylene, such as polyethylene, poly(l-butene), polyisobutene, poly(l-pentene), and poly(l-methylpentene); copolymers of α-olefins, such as propylene-butene copolymers and ethylene-butene copolymers; vinyl monomer-diene monomer random copolymers, such as styrene-butadiene random copolymers; vinyl monomer-diene monomer-vinyl monomer random copolymers, such as styrene-butadiene-styrene block copolymers; and the like. The compounded amount of the other resin is preferably 10 parts by mass or less, and more preferably 5 parts by mass or less, per 100 parts by mass of the polypropylene resin.

The polypropylene film of the present invention may contain at least one type of additive as necessary in addition to the polypropylene resin described above. The additive is not particularly limited as long as it is an additive ordinarily used in polypropylene resins. Examples of such an additive include stabilizers such as antioxidants, chlorine absorbers and an ultraviolet absorbers, lubricants, plasticizers, flame retardants, antistatic agents, colorants, and the like. Such an additive may be added to the polypropylene resin in the range that does not impair the effect of the present invention.

The "antioxidant" is not particularly limited as long as it is an antioxidant ordinarily used in polypropylene. The antioxidant is typically used for two types of purposes. One of the purposes is to inhibit thermal degradation and oxidative degradation inside an extruder. The other purpose is to inhibit deterioration and contribute to enhancement of capacitor performance during long-term use as a capacitor film. The antioxidant that inhibits thermal degradation and oxidative degradation inside an extruder is referred to as "primary agent", and the antioxidant that contributes to enhancement of capacitor performance is referred to as "secondary agent". Two types of antioxidants may be used for these two purposes, or one type of antioxidant may be used for the two purposes.

When two types of antioxidants are used, the polypropylene resin may contain, for example, as a primary agent approximately from 1,000 ppm to 4,000 ppm of 2,6-ditertiary-butyl-para-cresol (generic name: BHT) relative to the amount of the polypropylene resin (100 parts by mass). The antioxidant for this purpose is mostly consumed during a formation step in an extruder and hardly remains in the film after the film formation (and is typically present at a residual amount of less than 100 ppm).

As the secondary agent, a hindered phenol-based antioxidant having a carbonyl group can be used. Although the hindered phenol-based antioxidant having a carbonyl group that can be used in the present invention is not particularly limited, examples thereof include triethylene glycol-bis[3-(3-tertiary-butyl-5-methyl-4-hydroxyphenyl)propionate] (trade name: Irganox 245), 1,6-hexanediol-bis[3-(3,5-ditertiary-butyl-4-hydroxyphenyl)propionate] (trade name: Irganox 259), pentaerythrityl-tetrakis[3-(3,5-di-tertiary-butyl-4-hydroxyphenyepropionate] (trade name: Irganox 1010), 2,2-thio-diethylenebis[3-(3,5-di-tertiary-butyl-4-hydroxyphenyepropionate] (trade name: Irganox 1035), octadecyl-3-(3,5-di-tertiary-butyl-4-hydroxyphenyl)propionate (trade name: Irganox 1076), N,N'-hexamethylenebis(3,5-ditertiary-butyl-4-hydroxy-hydrocinnamide) (trade name: Irganox 1098), and the like. Among these, pentaerythrityl-tetrakis[3-(3,5-di-tertiary-butyl-4-hydroxyphenyl)propionate] is most preferable due to its high molecular weight, high compatibility with polypropylene, low volatility and superior heat resistance.

The hindered phenol-based antioxidant having a carbonyl group is contained in the polypropylene resin in an amount of preferably 2,000 ppm or more and 7,000 ppm or less, and more preferably 3,000 ppm or more and 7,000 or less, relative to the total amount of the polypropylene resin, considering that it is substantially consumed in the extruder.

When the polypropylene resin does not contain the primary agent, the hindered phenol-based antioxidant having a carbonyl group may be used in a larger amount. In this case, since the amount of consumption of the hindered phenol-based antioxidant having a carbonyl group in the extruder increases, the hindered phenol-based antioxidant having a carbonyl group is preferably added at an amount of 3,000 ppm or more and 8,000 ppm or less per 100 parts by mass of the polypropylene resin.

In the present invention, to inhibit degradation that proceeds over time during a long-term use of the biaxially stretched polypropylene film, one or more types of the hindered phenol-based antioxidants having a carbonyl group (secondary agent) is preferably contained. The content of the secondary agent in the film is preferably 1,000 ppm or more and 6,000 ppm or less, and more preferably 1,500 ppm or more and 6,000 ppm or less, relative to the total amount of the polypropylene resin.

A film capacitor, which contains a particular, appropriate range of amount of the hindered phenol-based antioxidant having a carbonyl group that has suitable miscibility with polypropylene on a molecular scale, is preferable since long-term durability is enhanced while high voltage resistance is maintained without reducing electrostatic capacitance (without allowing degradation to proceed) over a long period of time even in life test at extremely high temperatures.

The "chlorine absorber" is not particularly limited as long as it is a chlorine absorber ordinarily used in polypropylene. Examples of the chlorine absorber include metal soap, such as calcium stearate.

The "ultraviolet absorber" is not particularly limited as long as it is an ultraviolet absorber ordinarily used in polypropylene. Examples of the ultraviolet absorber include benzotriazole (Tinuvin 328, manufactured by BASF, and the like), benzophenone (Cysorb UV-531, manufactured by Cytec, and the like), hydroxybenzoate (UV-CHEK-AM-340, manufactured by Ferro, and the like), and the like.

The "lubricant" is not particularly limited as long as it is a lubricant ordinarily used in polypropylene. Examples of the lubricant include primary amide (stearamide and the like), secondary amide (N-stearyl stearamide and the like), ethylene bis amide (N,N'-ethylene bis stearamide and the like), and the like.

The "plasticizer" is not particularly limited as long as it is a plasticizer ordinarily used in polypropylene. Examples of the plasticizer include polypropylene random copolymers and the like.

The "flame retardant" is not particularly limited as long as it is a flame retardant ordinarily used in polypropylene. Examples of the flame retardant include halogen compounds, aluminum hydroxides, magnesium hydroxides, phosphates, borates, antimony oxides, and the like.

The "antistatic agent" is not particularly limited as long as it is an antistatic agent ordinarily used in polypropylene. Examples of the antistatic agent include glycerin monoester (glycerin monostearate and the like), ethoxylated secondary amines, and the like.

The "colorant" is not particularly limited as long as it is a colorant ordinarily used in polypropylene. Examples of the colorant include cadmium- or chromium-containing inorganic compounds and azo- or quinacridone-organic pigments.

When the polypropylene resin contains the polypropylene (1) and the polymer (2) and the polypropylene resin is mixed for use in the present invention, the mixing method is not particularly limited; however, examples thereof include a method by which powder-like or pellet-like resins are dry-blended by a mixer or the like, a method by which a blended resin is obtained by melt-kneading powder-like or pellet-like resins in a kneader, and the like.

The mixer that can be used is not particularly limited, and a Henschel mixer, ribbon blender, Banbury mixer, or the like can be used. Furthermore, the kneader that can be used is also not particularly limited, and any of a single screw type, twin screw type, or multi screw type with more than two screws can be used. In the case of twin or multi screw type, any type of kneading with rotation in the same direction or in the opposite direction can be used.

In the case of blending by melt-kneading, the kneading temperature is not particularly limited as long as suitable kneading can be performed; however, typically, the temperature is in a range of 200 to 300° C., and preferably 230 to 270° C. Kneading at too high temperature is not preferable since the resin may be degraded. To inhibit the degradation during kneading and mixing of the resin, an inert gas, such as nitrogen, may be purged in the kneader. Mixed polypropylene raw material resin pellets can be obtained by pelletizing the melt-kneaded resin into an appropriate size using a conventionally known pelletizer.

The total ash content caused by the polymerization catalyst residues or the like contained in the polypropylene resin in the present invention is preferably as low as possible to enhance electrical properties. The total ash content is preferably 200 ppm or less, more preferably 100 ppm or less, and particularly preferably 75 ppm or less, relative to the amount of the polypropylene resin (100 parts by mass).

The biaxially stretched polypropylene film of the present invention can be obtained by biaxially stretching the polypropylene resin described above according to an ordinary method. In the present invention, a "cast sheet before stretching" for producing the biaxially stretched polypropylene film is preferably formed first using a publicly known method. For example, an unstretched cast sheet can be formed by supplying polypropylene resin pellets, dry mixed polypropylene resin pellets and/or powder, or mixed polypropylene resin pellets produced by melt-kneading in advance to an extruder, melt-heating and passing through a filter, then melt-extruding from a T-die by heating and melting at 170° C. to 320° C., and preferably from 200° C. to 300° C., and cooling and solidifying in at least one metal drum held at typically from 80° C. to 140° C., preferably from 90° C. to 120° C., and more preferably from 90° C. to 105° C. The thickness of the cast sheet is preferably from 0.05 mm to 2 mm, and more preferably from 0.1 mm to 1 mm.

The biaxially stretched polypropylene film can be produced by subjecting the polypropylene cast sheet to stretching treatment. As the stretching, biaxial stretching that stretches biaxially in longitudinal and lateral directions is performed, and examples of the stretching method include simultaneous or successive biaxial stretching method. However, a successive biaxial stretching method is preferred. A successive biaxial stretching method includes, for example, first maintaining the cast sheet at a temperature of 100 to 160° C., stretching 3-fold to 7-fold in the direction of flow by passing the sheet between rolls provided with different speeds, and immediately cooling the sheet to room temperature. After the stretched film is introduced to a tenter to stretch 3-fold to 11-fold in the width direction at a temperature of 160° C. or higher, the film is subjected to relaxation and heat fixing, and then wound. The wound film is subjected to aging treatment in an atmosphere at approximately 20 to 45° C., after which it can be cut into a desired product width.

The thickness of the biaxially stretched polypropylene film is preferably from 1 to 7 μm from the perspective of obtaining a small and high-capacity capacitor element. The use of the biaxially stretched polypropylene film having a thickness of 1.5 μm or more is more preferable. Furthermore, the used biaxially stretched polypropylene film has been preferably formed into an ultrathin film, and the thickness thereof is preferably 6 μm or less, and more preferably 5 μm or less. The thickness of the film can be measured in accordance with JIS-C2330 using a paper thickness tester, micrometer (JIS-B7502), or the like.

By such a stretching step, the stretched film which has excellent mechanical strength and rigidity and in which surface irregularities are more clearly defined and finely roughened can be formed. The surface of the biaxially stretched polypropylene film is preferably imparted with suitable surface roughness that results in favorable capacitor characteristics while improving winding suitability.

On at least one surface of the biaxially stretched polypropylene film, the surface roughness thereof is preferably 0.03 μm or more and 0.08 μm or less in terms of the center line average roughness (Ra), and the surface is preferably finely roughened to have the maximum height (Rz, formerly "Rmax" as defined in JIS) of 0.3 μm or more and 0.8 μm or less. When Ra and Rz are within the suitable ranges described above, the surface can be finely roughened, and wrinkles are less likely to be formed during process of winding an element, thereby winding can be suitably performed during capacitor processing. Furthermore, since uniform contact becomes possible between the films, voltage resistance and long-term voltage resistance can be also enhanced.

Note that "Ra" and "Rz" (formerly "Rmax" as defined in JIS) are values measured using, for example, a contact probe-type surface roughness tester (e.g. contact probe-type surface roughness tester with a diamond stylus or the like) that is ordinarily widely used in accordance with a method stipulated in JIS-B0601:2001 or the like. More specifically, for example, "Ra" and "Rz" can be determined in accordance with a method stipulated in JIS-B0601:2001 using a three-dimensional surface roughness tester, Surfcom model 1400D-3DF-12, manufactured by Tokyo Seimitsu Co., Ltd.

As the method of imparting fine roughness to the film surface, various publicly known surface roughening methods, such as embossing method and etching method, can be employed. Among these, a surface roughening method using β crystals is preferable since there is no need to introduce impurities. The rate at which β crystals are formed can be typically controlled by changing casting temperature and casting speed. Furthermore, the melting/transformation ratio of β crystals can be controlled with the roll temperature of the longitudinal stretching step, and fine roughness can be achieved by selecting the optimum production conditions for these two parameters of β crystal formation and their melting/transformation.

For the biaxially stretched polypropylene film, corona discharge treatment may be performed online or offline following completion of the stretching and heat fixing steps in order to enhance adhesive properties in post-processing such as a metal vapor deposition processing step. The corona discharge treatment can be performed by a publicly known method. As the atmosphere gas, air, carbon dioxide gas, nitrogen gas, or a mixed gas of these are preferably used.

In the biaxially stretched polypropylene film of the present invention, an electrode can be provided on one surface or both surfaces thereof. In a step of providing an electrode, examples of the method include a method in which a metal deposition film is formed on one surface of the biaxially stretched polypropylene film. Examples of the method of forming a metal vapor deposition film on the biaxially stretched polypropylene film include vacuum deposition methods, sputtering methods, and the like. From the perspectives of productivity, economical efficiency, and the like, a vacuum deposition method is preferable. When the metal vapor deposition film is formed by the vacuum deposition method, the method is appropriately selected from publicly known methods including those using a crucible and those using a wire. As the metal constituting the metal vapor deposition film, elementary metals, such as zinc, lead, silver, chromium, aluminum, copper, and nickel, mixtures of multiple types of these metals, alloys, and the like can be used. From the perspectives of environment, economical efficiency, film capacitor performance, especially temperature characteristics of insulation resistance and electrostatic capacitance, and frequency characteristics of insulation resistance and electrostatic capacitance, use of an elementary metal selected from zinc and aluminum, metal mixture, or alloy as the metal constituting the metal deposition film is preferable.

The film resistance of the metal vapor deposition film is preferably from 1 to 100Ω/□ from the perspective of electrical properties of the capacitor. From the perspective of self healing characteristics, the film resistance is preferably relatively high within this range, and more preferably 5Ω/☐ or more, and even more preferably 10Ω/☐ or more. Furthermore, from the perspective of safety as a capacitor element, the film resistance is more preferably 50Ω/☐ or less, and even more preferably 30Ω/☐ or less. The film resistance of the metal deposition film can be measured during metal vapor deposition by, for example, two-terminal sensing that is known to one skilled in the art. The film resistance of the metal vapor deposition film can be adjusted by adjusting the vaporized amount by adjusting the output of the vaporization source for example.

When the metal vapor deposition film is formed on one surface of the present biaxially stretched polypropylene film, an insulating margin is formed by excluding a certain width from an edge of one side of the film from the deposition so that a capacitor is formed when the obtained metallized polypropylene film is wound. Furthermore, to strengthen the bonding between the metallized polypropylene film and the metalicon electrodes (end electrodes sprayed with metal), a heavy edge structure is preferably formed on the other edge relative to the insulating margin. The film resistance of the heavy edge is typically from 1 to 8Ω/☐, and more preferably from 1 to 5Ω/☐.

Although the margin pattern of the metal vapor deposition film to be formed is not particularly limited, from the perspective of safety of the film capacitor or the like, a pattern including a so-called special margin such as a fishnet pattern and T-margin pattern is preferable. Formation of the metal vapor deposition film in a pattern including the special margin on one side of the biaxially stretched polypropylene film is preferable since safety of the resulting film capacitor is enhanced and breakage and/or short circuit of the film capacitor can be inhibited. As the method of forming the margin, conventionally known methods, such as a tape method in which masking is performed using tape during deposition, and an oil method in which masking is performed by applying oil, can be used without any restrictions.

The biaxially stretched polypropylene film containing the electrode (the electrode-containing biaxially stretched polypropylene film for capacitors) is processed to be a metallized polypropylene film capacitor after undergoing a winding process in which the film is wound up in the longitudinal direction of the film. That is, in the present invention, a pair of two metallized polypropylene films produced as described above is wound around in a manner that the metal vapor deposition film and the polypropylene film are overlaid and laminated alternately. A metallized polypropylene film capacitor is then obtained by a step of producing a film capacitor element by forming a pair of metalicon electrodes by subjecting the both end faces to metal thermal spraying.

In the step of producing a film capacitor element, winding processing of the film is performed. For example, a pair of two metallized polypropylene films are overlaid and wound around in a manner that the metal deposition part and the biaxially stretched polypropylene film are laminated alternately and that the insulating margin part is located on the other side. At this time, a pair of the two metallized polypropylene films is preferably laminated in a manner that the positions are shifted by 1 to 2 mm. The winder to be used is not particularly limited, and for example, the Automatic Winder model 3KAW-N2, manufactured by Kaido Mfg. Co., Ltd., or the like can be used.

When a flat capacitor element is produced, after the winding, typically, the obtained wound product is subjected to pressing. Tightening of the winding of the film capacitor element and/or formation of the element is promoted by the pressing. From the perspectives of controlling and/or stabilizing gaps between layers, the applied pressure is from 2 to 20 kg/cm², although the optimum value varies depending on the thickness of the polypropylene film or the like.

Subsequently, a film capacitor element is produced by forming metalicon electrodes by subjecting the both end faces of the wound product to metal thermal spraying.

A predetermined heat treatment is further performed on the metallized polypropylene film capacitor element. That is, the present invention include a step of performing heat treatment on the film capacitor element under vacuum at a temperature of 80 to 115° C. for 1 hour or longer (hereinafter, also referred to as "heat aging").

In the step of performing heat treatment on the film capacitor element described above, the temperature of the heat treatment is typically 80° C. or higher, and preferably 90° C. or higher. Meanwhile, the temperature of the heat treatment is typically 130° C. or lower, and preferably 125° C. or lower. The effect of heat aging can be achieved by performing the heat treatment at the temperature described above. Specifically, corona discharge is suppressed by reducing the gaps between films constituting the capacitor element formed from the metallized polypropylene film and crystallization proceeds due to the change in internal structure of the metallized polypropylene film. It is conceived that, as a result, voltage resistance is enhanced. When the temperature of the heat treatment is lower than the predetermined temperature, the effect of the heat aging cannot be obtained sufficiently. On the other hand, when the temperature of the heat treatment is higher than the predetermined temperature, pyrolysis, oxidative degradation, or the like may occur in the polypropylene film.

As the method of performing the heat treatment on the film capacitor element, for example, the method can be appropriately selected from publicly known methods, such as a method that uses a thermostatic chamber or a method that uses a high frequency induction heating in a vacuum atmosphere. In particular, a method that uses a thermostatic chamber is preferably employed.

The duration of the heat treatment is preferably 1 hour or longer, and more preferably 10 hours or longer, from the perspective of achieving mechanical and thermal stability; however, from the perspective of preventing formation failure, such as wrinkles caused by heat and embossing failure, the duration is preferably 20 hours or shorter.

Typically, lead wires are welded to the metalicon electrodes of the film capacitor element that has undergone the heat aging. Furthermore, to impart weatherability, especially to inhibit degradation by moisture, the capacitor element is preferably sealed in a case and potted in an epoxy resin.

The capacitor element obtained by the method of the present invention is a small and high-capacity film capacitor element formed from the metallized polypropylene film and has high voltage resistance at high temperatures and long-term durability at high temperatures.

EXAMPLES

The present invention will be further described using examples below; however, these examples are used to describe the present invention and do not limit the present invention. Furthermore, unless otherwise noted, "part" and "%" in the examples respectively represent "part by mass" and "mass %".

The number average molecular weight (Mn), weight average molecular weight (Mw), molecular weight distribution (Mw/Mn), mesopentad fraction ([mmmm]), melt flow rate (MFR), and ethylene content, which are values of physical properties, were measured by the following methods.

Note that the values of physical properties of the polypropylene resin below were values measured in the form of raw material resin (pellets). Furthermore, the polypropylene (1) contains 2,000 ppm of 2,6-di-tertiary-butyl-p-cresol (generic name: BHT) as the antioxidant (primary agent) and from 5,000 to 6,500 ppm of pentaerythrityl-tetrakis[3-(3,5-di-tertiary-butyl-4-hydroxyphenyl)propionate (trade name: Irganox 1010) as the hindered phenol-based antioxidant having a carbonyl group (secondary agent).

Number Average Molecular Weight (Mn), Weight Average Molecular Weight (Mw), and Molecular Weight Distribution (Mw/Mn)

The weight average molecular weight (Mw), number average molecular weight (Mn), and molecular weight distribution (Mw/Mn) of each resin were measured by gel permeation chromatography (GPC) under the following conditions.

The high-temperature GPC with built-in differential refractometer (RI), model HLC-8121GPC-HT, manufactured by Tosoh Corporation was used. As columns, three coupled TSKgel GMHHR-H(20)HT columns, manufactured by Tosoh Corporation, were used. Measurement was performed at the column temperature of 140° C. by flowing trichlorobenzene as an eluent at a flow rate of 1.0 mL/min. A calibration curve was created by using a polystyrene standard manufactured by Tosoh Corporation, and a weight average molecular weight (Mw) and a number average molecular weight (Mn) were obtained using the measured molecular weight based on calibration with the polystyrene. The molecular weight distribution (Mw/Mn) was obtained by using the values of Mw and Mn.

Measurement of Mesopentad Fraction ([mmmm])

The mesopentad fraction ([mmmm]) was determined by dissolving polypropylene in a solvent and using a high temperature Fourier transform nuclear magnetic resonance (high temperature FT-NMR) under the following conditions.
Measuring instrument: high temperature FT-NMR, JNM-ECP500, manufactured by JEOL Ltd.
Observed nucleus: $^{13}$C (125 MHz)
Measurement temperature: 135° C.
Solvent: ortho-dichlorobenzene [ODCB: a mixed solvent of ODCB and deuterated ODCB (4/1)]
Measurement mode: single-pulse proton broad-band decoupling
Pulse width: 9.1 μsec (45° pulse)
Pulse interval: 5.5 sec
Cumulative number of measurements: 4,500
Chemical shift standard: CH$_3$ (mmmm)=21.7 ppm A percentage (%) was calculated from the integrated intensity of each signal derived from a combination of pentad (such as mmmm, mrrm, and the like). For example, the description of spectrum in "T. Hayashi, et al., Polymer, Vol. 29, pp. 138 (1988)" or the like was referred to regarding assignment of each signal derived from mmmm, mrrm, and the like.

Measurement of Melt Flow Rate (MFR)

The melt flow rate was measured at 230° C. in accordance with JIS K 7210-1999.

Measurement of Ethylene Content

The ethylene content was determined by using a Fourier transform nuclear magnetic resonance spectrometer (FT-NMR) under the following conditions.
Measuring instrument: high temperature FT-NMR, VNMRS-400, manufactured by Varian
Observed nucleus: $^{13}$C (100.6 MHz)
Measurement mode: inverse gated decoupling
Chemical shift standard: pentad of propylene unit (mmmm) (21.86 ppm)

The ethylene content (mol %) was calculated from the integrated value of the signal of methylene carbons based on head-to-tail diads in accordance with the description in "Y.-D. Zhang et al., Polym. J. Vol. 35, pp. 551 (2003)" or the like.

Working Example 1

To the polypropylene (1) (Mw=31×10$^4$, Mw/Mn=8.6, mmmm=95 mol %, MFR=4.6 g/10 min), Daploy HMS-PP, WB135HM (MFR=2.5 g/10 min, melt tension=32 cN) manufactured by Borealis as the long-chain branched polypropylene (2a) was mixed in a content shown in Table 1 to obtain a mixed dry blended material. The obtained dry blended material was supplied to a single screw extruder manufactured by GM engineering K.K. (GM65-32 Extruder), melted at a resin temperature of 250° C., extruded using a T-die, and solidified by being wound around a metal drum to produce a cast sheet having a thickness of approximately 250 μm. Thereafter, this unstretched cast sheet was stretched 5-fold in the direction of flow at a temperature of 165° C. using a batch type biaxial stretching machine for use in laboratories (lab stretcher Karo IV) manufactured by Bruckner, and then immediately stretched 10-fold in lateral direction to obtain a thin biaxially stretched polypropylene film having a thickness of 5 μm.

The values of the physical properties of the biaxially stretched polypropylene film obtained by the composition shown in Table 1 are shown in Table 2.

Working Example 2

A thin biaxially stretched polypropylene film having a thickness of 5 μm was obtained in the same manner as in Working Example 1 except for changing the compounded amount of the long-chain branched polypropylene (2a) of Working Example 1 to the amount according to Table 1 for mixing.

The values of the physical properties of the biaxially stretched polypropylene film obtained by the composition shown in Table 1 are shown in Table 2.

Working Example 3

A thin biaxially stretched polypropylene film having a thickness of 5 μm was obtained in the same manner as in Working Example 2 according to the composition of Table 1 except for mixing Novatec PP BC03B (ethylene-propylene random copolymer), manufactured by Japan Polypropylene Corporation, having an ethylene content of 2.5 mol %, an MFR of 6 g/10 min, an Mw of 16×10$^4$, and an Mw/Mn of 3 as the ethylene-propylene copolymer (2b) in place of the long-chain branched polypropylene (2a) of Working Example 1.

The values of the physical properties of the biaxially stretched polypropylene film obtained by the composition shown in Table 1 are shown in Table 2.

Working Example 4

A thin biaxially stretched polypropylene film having a thickness of 5 μm was obtained in the same manner as in Working Example 1 according to the composition of Table 1 except for mixing a resin having a Mw of 109×10⁴ and a Mw/Mn of 5 as the ultra-high-molecular-weight polypropylene (2c) in place of the long-chain branched polypropylene (2a) of Working Example 1. Note that the ultra-high-molecular-weight polypropylene (2c) was produced by the following method.

Production of Ultra-High-Molecular-Weight Polypropylene (2c)

A propylene polymer was obtained by using a high-pressure polymerization reactor. In a polymerization reactor with the internal volume of 1 L, heptane as a solvent, 15 mg of diether-based Ziegler-Natta catalyst as a catalyst, and triisobutylaluminum as a co-catalyst were used. The total amount was adjusted to 500 mL and the propylene pressure was adjusted to 5 atm. After polymerization was performed at a reactor temperature of 50° C. for 1 hour, the reaction was terminated by a small amount of ethanol, and the polymerization reactor was purged with propylene. Thereafter, powder was separated and reprecipitated by xylene/methanol, and then dried at 80° C. under reduced pressure for a night to obtain a polypropylene polymer.

The values of the physical properties of the biaxially stretched polypropylene film obtained by the composition shown in Table 1 are shown in Table 2.

Comparative Example 1

A thin biaxially stretched polypropylene film having a thickness of 5 μm was obtained in the same manner as in Working Example 1 except for using only polypropylene (1) as the resin.

The values of the physical properties of the biaxially stretched polypropylene film obtained by the composition shown in Table 1 are shown in Table 2.

Comparative Example 2

A thin biaxially stretched polypropylene film having a thickness of 5 μm was obtained in the same manner as in Working Example 1 except for changing the compounded amount of the long-chain branched polypropylene (2a) of Working Example 1 to the amount according to Table 1 for mixing. The values of the physical properties of the biaxially stretched polypropylene film obtained by the composition shown in Table 1 are shown in Table 2.

Comparative Example 3

Although it was attempted to obtain a biaxially stretched polypropylene film in the same manner as in Working Example 3 except for changing the compounded amount of the ultra-high-molecular-weight polypropylene (2c) of Working Example 3 to the amount according to Table 1 for mixing, a thin film was not obtained.

The results are shown in Table 2.

TABLE 1

| | Resin content (mass %) | | | |
|---|---|---|---|---|
| | Poly-propylene (1) | Long-chain branched polypropylene (2a) | Ethylene-propylene copolymer (2b) | Ultra-high-molecular-weight polypropylene (2c) |
| Working Example 1 | 90 | 10 | — | — |
| Working Example 2 | 80 | 20 | — | — |
| Working Example 3 | 80 | — | 20 | — |
| Working Example 4 | 65 | — | — | 35 |
| Comparative Example 1 | 100 | — | — | — |
| Comparative Example 2 | 98 | 2 | — | — |
| Comparative Example 3 | 45 | — | — | 55 |

Method of Measuring Values of Physical Properties

Methods of measuring the values of physical properties of the working examples and the comparative examples are as described below.

Film Thickness

The thickness of the biaxially stretched polypropylene film was measured in accordance with JIS C 2330 using a micrometer (JIS B 7502).

Measurements of crystallite size and spacing value of (040) face of α-crystal and calculation of lattice constants The crystallite size and the spacing value of the biaxially stretched polypropylene film were measured as described below using a wide angle X-ray diffractometer (XRD).

Measuring instrument: desktop X-ray diffraction (XRD) instrument, MiniFlex 300, manufactured by Rigaku Corporation X-ray generation output: 30 kV, 10 mA Irradiated X-ray: Monochromatic CuKα radiation by monochromator (wavelength: 0.15418 nm)

Detector: Scintillation counter

Goniometer scanning: Coupled 2θ/θ scan

From the obtained data, a diffraction intensity curve was obtained by the integrated X-ray powder diffraction software PDXL provided in the instrument using a computer for analysis.

For the crystallite size, the half width of the α-crystal (040) face reflection peak was calculated. From the obtained half width of the α-crystal (040) face reflection peak, the crystallite size was determined using the Scherrer's equation expressed by Equation (1) below. Note that, in the present invention, the shape factor K was taken to be 0.94.

$$D = K\lambda/(\beta \cos\theta) \quad (3)$$

Note that D is the crystallite size (nm), K is a constant (shape factor), λ is the used X-ray wavelength (nm), β is the half width of the α-crystal (040) face reflection peak, and θ is the diffraction Bragg angle of (040) face of α-crystal.

Furthermore, the spacing value of (040) face of α-crystal was determined by measuring the diffraction angle 2θ of the α-crystal (040) face reflection peak obtained by the XRD analysis and performing calculation using the following Bragg's equation.

$$2d \sin\theta = \lambda \quad (1)$$

Note that d is the spacing value, θ is the measured diffraction angle, and λ is the wavelength of the used X-ray (in the present invention, λ=0.15418 nm).

Furthermore, from the spacing value d of crystal diffractions of (110) face of α-crystal, (040) face of α-crystal, (130)

face of α-crystal, and the like obtained by the XRD measurement described above, lattice constants of the a-axis, the b-axis, and the c-axis of the polypropylene crystal were obtained by the following Equation (2).

[Equation 2]

$$\frac{1}{d^2} = \frac{1}{\sin^2\beta}\left(\frac{h^2}{a^2} + \frac{k^2\sin^2\beta}{b^2} + \frac{l^2}{c^2} - \frac{2hl\cos\beta}{ac}\right) \quad (2)$$

In Equation (2), d is the spacing value of α-crystal, h, k, and l are the Miller indices (hkl) of the α-crystal assigned to the spacing value thereof (in the case where the indices are assigned to the diffraction lines of (040) face of α-crystal, h=0, k=4, and l=0), a is the lattice constant of the a-axis, b is the lattice constant of the b-axis, c is the lattice constant of the c-axis, and β is the angle of inclination formed by the α-axis and the c-axis (when the α-crystal is a monoclinic crystal).

Dielectric Breakdown Voltage

The dielectric breakdown voltage value was measured at 100° C. using an alternating current (AC) power source in accordance with JIS C2330 (2001) 7.4.11.2 B (plate electrode method). The dielectric breakdown voltage ($V_{AC}/\mu m$) was determined by dividing the average dielectric breakdown voltage values ($V_{AC}$) of 12 measurements by the thickness (μm) of the film and then calculating the average value of the 8 values after excluding the two highest values and the two lowest values.

Note that the dielectric breakdown voltage at 100° C. of 230 $V_{AC}/\mu m$ or higher indicates significantly excellent dielectric breakdown properties.

TABLE 2

| | Thickness (μ/m) | Crystallite size (nm) | $d_{040}$ (nm) | $L_a$ (nm) | $L_b$ (nm) | Dielectric breakdown voltage ($V_{AC}/\mu m$) |
|---|---|---|---|---|---|---|
| Working Example 1 | 5 | 13.5 | 0.526 | 0.667 | 2.105 | 237 |
| Working Example 2 | 5 | 13.1 | 0.530 | 0.670 | 2.120 | 264 |
| Working Example 3 | 5 | 13.5 | 0.527 | 0.668 | 2.110 | 247 |
| Working Example 4 | 5 | 13.0 | 0.528 | 0.669 | 2.112 | 261 |
| Comparative Example 1 | 5 | 14.3 | 0.520 | 0.666 | 2.09 | 220 |
| Comparative Example 2 | 5 | 14.2 | 0.523 | 0.665 | 2.10 | 215 |
| Comparative Example 3 | Film was not formed | | | | | |

Results and Discussion

As is clear from Working Examples 1, 2, 3, and 4, the biaxially stretched polypropylene films of the present invention were films having high dielectric breakdown voltage values at a high temperature of 100° C. Therefore, the biaxially stretched polypropylene films of the present invention were extremely suitable for capacitor films having excellent heat resistance and high voltage resistance.

On the other hand, in the case of polypropylene resin composition based on conventional technologies, the spacing value of (040) face of α-crystal of the biaxially stretched polypropylene film was out of the range according to the present invention, and the dielectric breakdown voltage value was poor (Comparative Example 1).

Furthermore, even in the case where the long-chain branched polypropylene (2a) was contained in the polypropylene resin, when the spacing value of (040) face of α-crystal was small and was out of the range according to the present invention, the dielectric breakdown voltage value was poor (Comparative Example 2).

INDUSTRIAL APPLICABILITY

Since the biaxially stretched polypropylene film for capacitors of the present invention has excellent dielectric breakdown voltage, enhancement of voltage resistance at high temperatures, especially initial voltage resistance and long-term voltage resistance, is expected by producing a capacitor using this film. Furthermore, since the biaxially stretched polypropylene film for capacitors of the present invention can be thin while having excellent dielectric breakdown voltage, the biaxially stretched polypropylene film can be suitably used in a small and high-capacity capacitor that is required to have high voltage resistance.

The invention claimed is:

1. A biaxially stretched polypropylene film for capacitors, comprising a polypropylene resin, the film having a spacing value of (040) face of α-crystal measured by X-ray diffraction of 0.525 to 0.530 nm,
the polypropylene film having a crystallite size of 13.5 nm or less as determined by the Scherrer's equation from the half width of the reflection peak from (040) face of α-crystal measured by a wide angle X-ray diffraction method,
the polypropylene resin containing:
(1) polypropylene having a weight average molecular weight of 250,000 to 450,000 and a molecular weight distribution of 6 to 12; and
(2) at least one polymer selected from the group consisting of
(2b) an ethylene-propylene copolymer having an ethylene content of less than 5 mol %, and
(2c) ultra-high-molecular-weight polypropylene having a weight average molecular weight of 800,000 to 1,400,000 and a molecular weight distribution of 3 to 6.

2. The biaxially stretched polypropylene film for capacitors according to claim 1, wherein the lattice constant in an a-axis direction is 0.665 to 0.675 nm, and the lattice constant in a b-axis direction is 2.100 to 2.120 nm, as determined from the spacing value of a crystal measured by X-ray diffraction.

3. An electrode-containing biaxially stretched polypropylene film for capacitors, comprising the biaxially stretched polypropylene film for capacitors according to claim 1, and an electrode on one side or both sides of the polypropylene film.

4. A capacitor comprising the biaxially stretched polypropylene film for capacitors according to claim 1.

5. The biaxially stretched polypropylene film for capacitors according to claim 1, wherein the polymer (2) is contained in an amount of 10 to 40 mass % in the polypropylene resin.

* * * * *